Jan. 15, 1952     A. L. SCHOELLERMAN     2,582,358
METHOD OF PRODUCING STIFFENED SKIN PANEL
Filed June 8, 1948
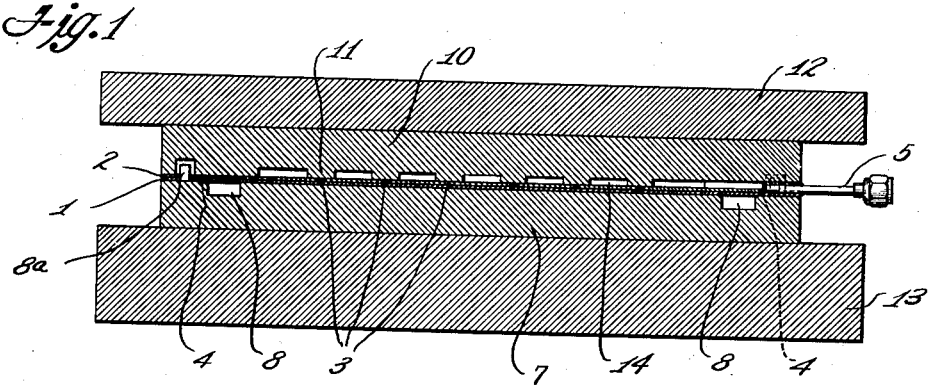
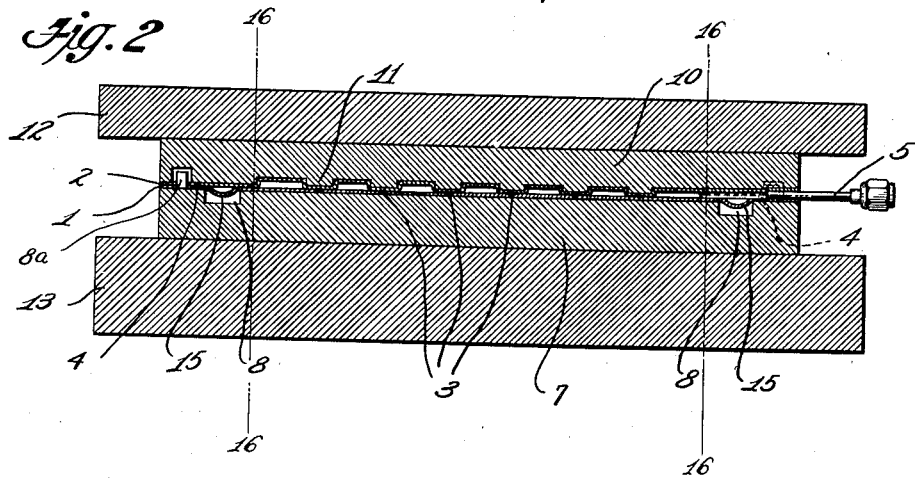
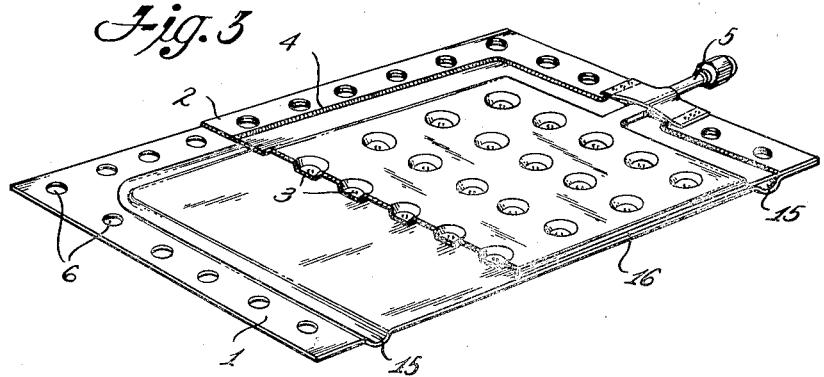
INVENTOR.
ALVIN L. SCHOELLERMAN
BY Herbert E. Metcalf
Attorney Patented Jan. 15, 1952

2,582,358

UNITED STATES PATENT OFFICE 2,582,358

METHOD OF PRODUCING STIFFENED SKIN PANEL

Alvin Leo Schoellerman, Los Angeles, Calif., assignor to Northrop Aircraft, Inc., Hawthorne, Calif., a corporation of California Application June 8, 1948, Serial No. 31,757

1 Claim. (Cl. 113—51)

My invention relates to a means and method of sheet metal fabrication in which fluid pressure is made to expand one sheet of metal with respect to another sheet, and more particularly to a means and method of sheet metal fabrication adapted to produce stiffened panels, with one face having a smooth contour suitable for use as an airfoil surface.

In aircraft construction, for example, it is desirable to utilize panels having a skin sheet stiffened by ribs on the back thereof. In order that the skin be smooth, it has been customary to form both the skin and the ribs from aluminum alloy and to rivet the skin to the ribs.

In general, the aluminum alloy skin sheets for the required strength are sufficiently thick so that no significant oil canning occurs in the rolled sheets as supplied by the manufacturer and the skin, after being fastened to the stiffeners, is sufficiently smooth to be utilized as an airfoil surface.

In fact, it is often the practice in the airplane industry to use skin sheets thicker than is required for strength, merely to obtain a smooth surface. Such use, of course, imposes a weight penalty on the airplane.

However, when thinner skin sheets are utilized, and particularly when skin sheets of ferrous material such as thin stainless steel are fastened to stiffening ribs, canning of the sheets is sufficiently serious that airfoil panels made, for example, by spot welding a thin stainless steel skin to stiffening members have not found favor in the aircraft industry, even though the ease of welding is much greater than that of riveted aluminum alloy skin panels.

It is an object of the present invention to provide a means and method of producing an airfoil panel having a smooth, tight and thin skin with all canning and wrinkles removed from the skin portion thereof.

In broad terms, the invention comprises uniformly stretching a skin sheet in all directions parallel to the extent of the sheet beyond the elastic limit of the material either before or after fastening the skin sheet to a stiffening member. If desired, the stiffening member may be formed at the same time the skin is stretched. In either case, the edgewise stretching of the skin sheet removes all canning and wrinkles and provides a hard tight skin suitable for use as an airfoil surface and, with the stiffeners fastened thereto, provides a highly satisfactory skin panel having a high strength-weight ratio.

It has been hitherto known that two flat sheets of metal can be fastened together around the edges thereof and hydraulic fluid under pressure introduced between the sheets and one or both sheets expanded into die cavities to form chambers between the sheets. However, when only one sheet is to be expanded, the sheet not expanded must be relatively very thick to resist the expansion forces applied thereto in expanding the other sheet, otherwise excessive wrinkling will occur. Such an arrangement has not been found satisfactory for thin skin sheets. With the present method the skin sheet can be materially thinner than the stiffening sheet. The nature of the improvement is shown in the accompanying drawings, wherein:

Figure 1 is a cross sectional view showing two attached metal sheets in place between forming dies before expansion to form a waffle-bead reinforced panel.

Figure 2 is a cross sectional view showing the same specimens after expansion.

Figure 3 is a perspective view showing the completed structural element, partially cut away to show parts on different levels.

Referring to the drawings, a thin skin sheet preferably of hardened metal I and a stiffening sheet preferably of annealed metal 2 are placed one over the other and spot welded, regardless of any attendant wrinkling, with internal welding spots 3 spaced to outline a waffle-bead pattern to be formed on the stiffening sheet 2. However, the sheets need not be entirely spot welded together until after the forming operation, if so desired. The two sheets are then provided with a seam weld 4 welded all around, somewhat inwardly from the edges, except for one opening through which oil under pressure is to be forced between the sheets through a fluid inlet 5 welded to the sheets. The sheets I and 2 are also provided with spaced tooling holes 6 between seam weld 4 and the edges of the sheets as shown in Figure 3.

The composite sheet is then placed on a skin die member 7 having the desired smooth, flat, or nearly so, contour in contact with the lower sheet I. Near the outside edge, the skin die member 7 is provided with an expansion cavity 8 extending as a ring all around the sheet and of sufficient depth to accommodate all excess material from the lower sheet I that will be stretched into the cavity. Skin die member 7 is also provided with tooling pins 8a passing through tooling holes 6 in the sheets to accurately position the sheets. The dimensions and arrangement of the parts are such that the seam weld 4 lies outside of the ring cavity 8, and all of the usable portion of the panel lies inside of the ring cavity 8.

A stiffening die member 10, provided with a desired waffle-bead pattern is placed over the stiffening sheet 2, this die member having its projections 11 contacting the welding spots 3 of the sheets 1 and 2, or contacting the places where the welding spots will be placed later. This contact is heavy enough to prevent the welding spots from moving out of the plane of the lower sheet, but light enough to permit lateral motion of both sheets during stretching.

The assembly is then held solidly between suitable restraining blocks 12 and 13, and oil under pressure is introduced between the sheets 1 and 2 through the inlet 5 so that the annealed stiffening sheet 2 is expanded into the cavity portions 14 of the stiffening die member 10, into the desired stiffening pattern. The expansion of the stiffening sheet 2 into the die member 10 work hardens the material, so that both sheets are then hard. As this expansion takes place, the force exerted in the opposite direction flattens the hardened skin sheet 1 against the skin die member 7 and removes all wrinkles. High pressure oil also expands the skin sheet 1 into the ring cavity 8 to form a bead 15, which additionally creates a positive edgewise tension on the sheet. These simultaneous loads stretcher level the lower sheet 1 by taking it beyond its elastic limit.

Oil pressure is then released, the oil is drained from between the sheets and the sheets are trimmed to shape along line 16—16, removing the expansion bead 15, the seam weld 4, and tooling holes 6. Because of the flattening pressure and the tension pull exerted on all sides of the lower sheet, it will now be absolutely smooth without wrinkles or oil can spots of any kind. Additional welding, if desired or needed, may then be performed to complete the procedure.

It will be noted in the process described above that the expansion of the skin metal into the expansion cavity is due both to the direct hydraulic pressure on the skin and to the edgewise pull on the skin sheet by the expansion of the skin sheet into the expansion cavity. However, as the expansion fold does not appear on the finished panel, the remaining area of the skin is smooth even when skin sheets as thin as .010" are utilized.

As the entire skin is stretched laterally, the welding spots placed on the panel before stretching will be farther apart after stretching, the change in dimensions depending on the skin material and the pressure applied. This change in dimension, however, should be taken into consideration to insure the spots being in the right position in the final panel.

It is also to be noted that the method of stretcher levelling the skin sheet described herein produces a different result from prior methods where a mechanical pull is applied only to the edges of a sheet prior to welding. In large sheets the interior of the sheet is not satisfactorily levelled, most of the stretch taking place at or near the edges. In the present method, pressure is applied at a right angle to the sheet extent evenly over the entire area of the panel proper, thus insuring an even stretch over the entire panel skin.

While I have described a preferred process in which the stiffening sheet is formed at the same time the skin sheet is stretcher levelled, the skin sheet alone can be stretched as described by omitting the stiffening sheet and applying pressure to the skin sheet between a covering die member sealed to the edges of the skin sheet, as by a gasket, and the skin sheet placed on the skin die member. The skin may thereafter be welded or otherwise fastened to one or more stiffening members as desired.

What is claimed is:

The method of producing a stiffened skin panel which comprises superimposing a skin sheet and a stiffening sheet, both of said sheets being substantially flat except for oil can distortions and the like, sealing the edges of said sheets together except at one opening, clamping said sheets within a die comprising a substantially flat skin member contacting all of said skin sheet except for a ring portion adjacent, but not including, said edges, and a stiffening member contacting said stiffening sheet except for portions defining a stiffening pattern when said stiffening sheet is expanded and applying hydraulic fluid under pressure through said opening to expand said stiffening sheet into said stiffening pattern and to flatten said skin sheet against said skin member and to simultaneously apply a tensioning stress to said skin member by drawing skin metal into said ring portion, removing said expanded sheets from said die and trimming said panel by removing the sealed edges and the portion carrying the metal drawn into said ring portion of the die.

ALVIN LEO SCHOELLERMAN.

REFERENCES CITED

The following references are of record in the file of this patent:

UNITED STATES PATENTS

| Number | Name | Date |
| --- | --- | --- |
| 1,685,388 | White | Sept. 25, 1928 |
| 1,709,865 | Muffly | Apr. 23, 1929 |
| 1,712,085 | Little | May 7, 1929 |
| 2,234,839 | Edwards | Mar. 11, 1941 |
| 2,244,475 | Raskin | June 3, 1941 |
| 2,294,137 | Spofford | Aug. 25, 1942 |